Jan. 11, 1966 J. C. BALDER ETAL 3,229,114

BISTABLE CIRCUITS INCLUDING TUNNEL DIODES HAVING MUTUALLY DIFFERENT NOMINAL CHARACTERISTICS

Filed June 9, 1961

INVENTOR
JOHAN C. BALDER.
JAN TE WINKEL.
BY [signature]
AGENT

United States Patent Office 3,229,114

Patented Jan. 11, 1966

3,229,114

BISTABLE CIRCUITS INCLUDING TUNNEL DIODES HAVING MUTUALLY DIFFERENT NOMINAL CHARACTERISTICS

Johan Cornelis Balder and Jan Te Winkel, Eindhoven, Netherlands, assignors to North American Philips Company, Inc., New York, N.Y., a corporation of Delaware

Filed June 9, 1961, Ser. No. 116,162

Claims priority, application Netherlands, July 29, 1960, 254,369

4 Claims. (Cl. 307—88.5)

This invention relates to bistable circuits which include a tunnel diode and which may be brought from a condition of low current conductivity to a condition of high current conductivity by the action of a control current. Bistable circuits per se are used on a large scale, for example in computer technique.

A primary object of the invention is to provide a circuit which can switch currents of considerable magnitude on and off reliably and with a substantially lower magnitude of control current. For this purpose one aspect of the invention is characterized in that use is made of two tunnel diodes having different current-voltage characteristics, the tunnel diodes being connected in series to a supply voltage source of suitable value; the maximum value for the current of the first tunnel diode is substantially greater than that for the second tunnel diode; the maximum value for the current of the second diode is at least several times greater than the minimum value for the current of the first tunnel diode.

Circuits in which two tunnel diodes are connected in series with a voltage source to form an astable circuit are known. However, these circuits do not utilize tunnel diodes having mutually different characteristics.

In order that the invention may be readily carried into effect, an embodiment thereof will now be described in detail, by way of example, with reference to the accompanying drawing, in which.

Figure 1:
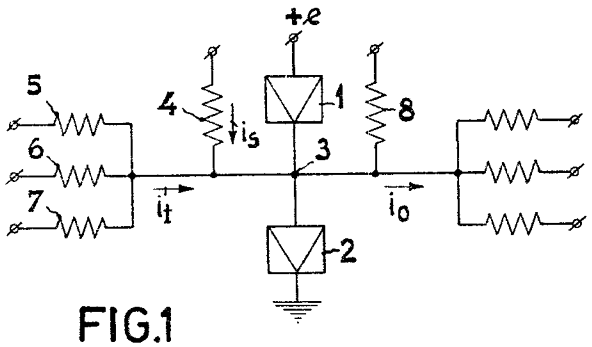
FIGURE 1 shows one embodiment of a circuit according to the invention.

The circuit shown in FIGURE 1 comprises a first tunnel diode 1 and a second tunnel diode 2, the two tunnel diodes being connected in series to a supply voltage source $e$. The common point 3 of the tunnel diodes 1 and 2 is connected to a current source $i_s$ through a resistor 4 by means of which the current through each of the tunnel diodes may be adjusted to a desired value. To the point 3 are also supplied control current $i_t$ via blocking resistors 5, 6 and 7 by means of which the circuit may be brought from a condition of low current-conductivity to one of high current-conductivity. The control current may be in the form of either a continuous direct current or a pulse. Hereinafter $i_t$ indicates more particularly the deviation of the control current from a no-load value (which may be zero, if desired). The circuit is restored from its condition of high current-conductivity to that of low current-conductivity by means of a restoring current (usually in the form of a pulse) which is supplied via a resistor 8 to the point 3.

Figure 2:
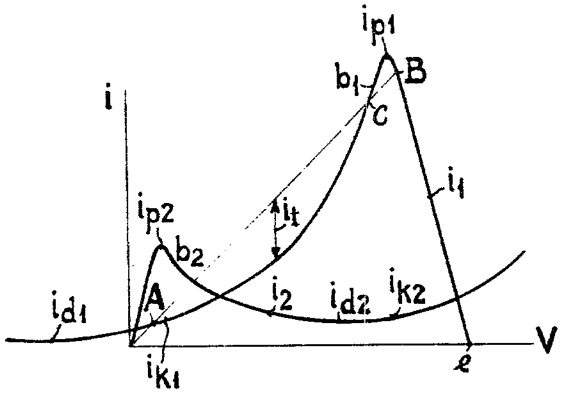
FIGURE 2 shows characteristics of tunnel diodes used in this circuit.

According to the invention, use is made of tunnel diodes having different characteristics. The characteristics $i_1$ and $i_2$ of FIGURE 2 show the currents $i_1$ and $i_2$ respectively, which traverse the tunnel diodes 1 and 2 in the forward direction as a function of the voltage $v$ at point 3. These characteristics, as can be seen from the figure, are such that the current increases steeply upon increase of the forward voltage across the diodes, subsequently reaches a maximum (peak value) $i_{p1}$ and $i_{p2}$ respectively, then gradually decreases to a minimum value (valley value) $i_{d1}$ and $i_{d2}$ respectively (during which decrease the diodes show a negative resistance) and then increases gradually again at the end. The bends $b_1$ and $b_2$ in the negative resistance portions then usually lie close to the maximum values $i_{p1}$ and $i_{p2}$ respectively of the current. (The voltage $v$ at point 3 is plotted as an abscissa in FIGURE 2 and is the voltage between point 3 and ground; therefore if there is a low voltage across the diode 1, the voltage $v$ has a value approximating the supply voltage $e$; an increase in the voltage across the diode 1 means that the voltage $v$ is displaced further to the left; another way of stating this is that an increase of the voltage across diode 1 results in a decrease of the voltage across diode 2.)

By using this negative resistance portion in the characteristic of a tunnel diode, a known bistable circuit may be obtained by means of one tunnel diode and a resistor (which replaces for example the diode 2 of FIGURE 1). Due to the gradual variation of the negative resistance portion of the characteristic, or in other words, due to the bend $b$ lying so close to the maximum value $i_p$, a comparatively large control current is necessary for bringing the circuit from its state of low current-conductivity (state 0) to its state of high current-conductivity (state 1). The resistance is chosen with a value such that a load line results which corresponds to the dotted line in FIGURE 2, the stable conditions then corresponding to the points of intersection A and B, respectively, of the dotted line with the curve $i_1$ with the unstable condition being located at point C; the required control current $i_t$ must have a minimum value as indicated. If the tunnel diode 1 is in the state A, a current pulse having at least the value $i_t$ is needed to bring the diode to the state B. For current pulses having a value less than $i_t$, the part of the characteristic between points A and D is traversed; at the end of the pulse, the circuit condition returns to the point A. True, $i_t$ would become smaller if the resistor which replaces the diode 2 would have a smaller value, that is to say if the broken line in FIGURE 2 would be steeper, but in this case the difference between the currents in the conditions 1 and 0 and hence between the currents corresponding to the points B and A in FIGURE 2 decreases; this would reduce the reliability of the circuit, because the location of the point of intersection A would then be greatly dependent upon small tolerances which are possible in the characteristics of the tunnel diodes.

The invention is based in part on the experimental determination that such tolerances have a proportional character. The deviations from the current value $i_{d1}$ are, measured in the absolute sense, considerably less than those from the current value $i_{p1}$. It is therefore important that, in the stable conditions of the circuit, the tunnel diodes convey currents which differ but slightly from the current values $i_d$ and $i_p$ respectively.

By using two identical tunnel diodes it is possible, if the supply voltage $e$ is chosen to be so low that the bends $b_1$ and $b_2$ of the two diodes approximate each other, to obtain a considerable decrease in the control current $i_t$ required, but the circuit then again loses considerably in reliability, since the one tunnel diode is always operated at a current considerably higher than $i_d$.

These difficulties are mitigated by the particular choice of two tunnel diodes having different nominal characteristics. The maximum current $i_{p1}$ of the one tunnel diode 1 must be considerably greater, for example by a factor 3, than that of the other, while the last-mentioned current value ($i_{p2}$) in turn must be greater by, for example a factor 6, than the minimum current $i_{d1}$ of the first-mentioned tunnel diode 1.

Figure 3:
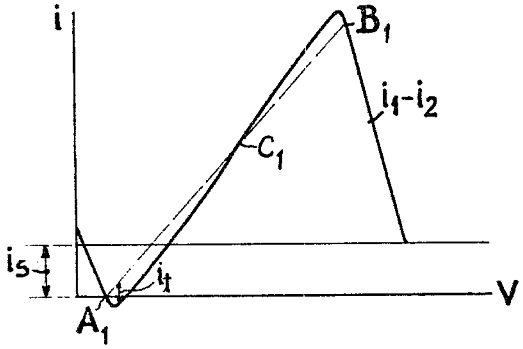
FIGURE 3 shows the switching characteristic of the complete circuit.

FIG. 3 shows the switching characteristic when two tunnel diodes are used, specifically two tunnel diodes having the characteristics $i_1$ and $i_2$ shown in FIG. 2. The switching characteristic of FIG. 3 is labeled $i_1$–$i_2$ and is in fact obtained by subtracting the curve $i_2$ from the curve $i_1$ of FIG. 2. The two curves of FIG. 2 are subtracted to obtain the combined switching characteristic of FIG. 3 since the voltage $v$ used as the abscissa is the voltage appearing at point 3 of FIG. 1, which is located between the two diodes.

By suitable choice of the voltage $e$ it can be ensured that in the characteristic $i_1$–$i_2$ of FIG. 3, showing the difference between the characteristics $i_1$ and $i_2$ of FIGURE 2, the curvature of the portion of the characteristic $i_1$ to the left of the bend $b_1$ is compensated to some extent by the corresponding curvature of the portion in the characteristic $i_2$ about the minimum $i_{d2}$, while the maxima $i_{p1}$ and $i_{p2}$ correspond to currents $i_{k2}$ and $i_{k1}$ respectively, these currents differing only slightly from the minimum values $i_{d2}$ and $i_{d1}$ respectively. By a suitable choice of the resistance of point 3 relative to ground, corresponding to the dotted load line of FIGURE 3, the two stable points of adjustment $A_1$ and $B_1$ of the circuit are found at which only a small current $i_k$, as indicated by the arrow, is required for changing over from one stable condition (point $A_1$) to the other stable condition (point $B_2$). Three points of intersection of the load line with the combined characteristic are shown in FIG. 3; the points $A_1$ and $B_1$ are stable, while the point $C_1$ is unstable. A current pulse having a value less than $i_t$ in FIG. 3 will switch the circuit only to point $C_1$, which is unstable, and the circuit condition will return to point $A_1$ at the end of the pulse. By means of the adjusting current $i_s$ provision may be made that, in the condition 0, the output current $i_o$ of the circuit is either zero or has a no-load value equal to that of the input current (control current).

Thus, for the tunnel diode 1 the condition applies that the ratio between the current values $i_{p1}$ and $i_{d1}$ shall be very high, for example approximately 20. Such a tunnel diode may be obtained by using a semi-conductive connection of two chemical elements, preferably Ga As, positioned symmetrically in the periodic table with respect to the IV$^{th}$ group. The diode 2, however, may advantageously be manufactured on a basis of Ge or, if desired, Si. In this case a smaller tolerance for the maximum value of current is found in the characteristics.

By suitable adjustment of the current, the circuit may be used as an AND-circuit or an OR-circuit, or in general as a coincidence gate. For this purpose the current $i_1$ is delivered by a plurality of input source connected to the resistors 5, 6 and 7. It may also be advantageous, for example in order to avoid interference, to supply the adjusting current $i_s$ in the form of gate pulses so that the circuit is blocked during the absence of control pulses. Other modifications of the circuit arrangement described will be readily apparent to those skilled in the art, such modifications lying within the inventive concept of the invention, the scope of which is set forth in the appended claims.

What is claimed is:

1. A bistable circuit comprising two tunnel diodes connected in series with a source of supply voltage, means for applying a control current to the junction of said diodes, the nominal static characteristics of said diodes being substantially different in magnitude with the peak current value of one diode being substantially greater than that of the other diode.

2. A bistable circuit comprising two tunnel diodes connected in series with a source of supply voltage, means for applying a control current to the junction of said diodes, the nominal static characteristics of said diodes being substantially different in magnitude with the peak current value of the first diode being substantially greater than that of the second diode, and the peak current value of the second diode being substantially greater than the valley current value of the first diode.

3. A bistable circuit as claimed in claim 2, wherein said one diode is composed of a semi-conductive compound and said other diode is composed of a semi-conductive element.

4. A bistable circuit as claimed in claim 2, wherein said first diode is composed of a semi-conductive compound and said second diode is composed of a semi-conductive element.

References Cited by the Examiner

UNITED STATES PATENTS

| | | | |
|---|---|---|---|
| 3,027,464 | 3/1962 | Kosonocky | 307—88.5 |
| 3,069,564 | 12/1962 | DeLange | 307—88.5 |
| 3,075,087 | 1/1963 | Lo | 307—88.5 |
| 3,094,631 | 6/1963 | Davis | 307—88.5 |
| 3,105,922 | 10/1963 | Fukui et al. | 307—88.5 |

OTHER REFERENCES

International Solid-State Circuits Conference Digest of Technical Paper, February 19, 1960, page 10, "The Tunnel Diode As A Logic Element," M. H. Lewin et al.

ARTHUR GAUSS, *Primary Examiner.*

JOHN W. HUCKERT, *Examiner.*